United States Patent
Castillo Cervantes et al.

(10) Patent No.: US 10,017,397 B2
(45) Date of Patent: Jul. 10, 2018

(54) NANOSTRUCTURED TITANIA SEMICONDUCTOR MATERIAL AND ITS PRODUCTION PROCESS

(71) Applicant: INSTITUTO MEXICANO DEL PETROLEO, Mexico City (MX)

(72) Inventors: Salvador Castillo Cervantes, Mexico City (MX); Isidro Mejia Centeno, Mexico City (MX); Roberto Camposeco Solis, Mexico City (MX); Florencia Marina Moran Pineda, Mexico City (MX); Juan Navarrete Bolanos, Mexico City (MX); J. Ascension Montoya De La Fuente, Mexico City (MX); Alfredo Vargas Escudero, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 7 days.

(21) Appl. No.: 15/399,052

(22) Filed: Jan. 5, 2017

(65) Prior Publication Data

US 2017/0183239 A1    Jun. 29, 2017

Related U.S. Application Data

(62) Division of application No. 13/922,952, filed on Jun. 20, 2013, now Pat. No. 9,580,332.

(30) Foreign Application Priority Data

Jun. 21, 2012    (MX) .................... MX/a/2012/007270

(51) Int. Cl.
*C01G 23/053* (2006.01)
*B01J 21/06* (2006.01)
(Continued)

(52) U.S. Cl.
CPC .......... *C01G 23/053* (2013.01); *B01J 21/063* (2013.01); *B01J 35/02* (2013.01); *B01J 37/036* (2013.01);
(Continued)

(58) Field of Classification Search
None
See application file for complete search history.

(56) References Cited

U.S. PATENT DOCUMENTS 6,034,203 A      3/2000 Lustig et al.
6,245,708 B1 *   6/2001 Wachs ..................... B01J 23/24
                                                  502/305
(Continued)

FOREIGN PATENT DOCUMENTS

CA        1156210         11/1983
WO      2005/030680        4/2005

OTHER PUBLICATIONS

Bakardjieva, S. et al., Transformation of brookite-type TiO2 nanocrystals to rutile: correlation between microstructure and photoactivity, J. Mater. Chem., 2006, 16, 1709-1716.
(Continued)

*Primary Examiner* — Tahseen N Khan
(74) *Attorney, Agent, or Firm* — Dickinson Wright PLLC

(57) ABSTRACT

A semiconductor material basically consists of titanium oxide, with the special feature of being like nanostructures, which gives special physicochemical properties, with ability to disperse and stabilize metal particles with high activity and selectivity in catalytic processes mainly. The process of producing the semiconductor material includes adding a titanium alkoxide to an alcoholic solution, adding an acid to the alcoholic solution, controlling the pH from 1 to 5; subjecting the acidic solution to agitation and reflux conditions at 70 to 80° C.; stabilizing the medium and adding
(Continued)

bidistilled water in a water/alkoxide molar ratio of 1-2/ 0.100-0.150, continuing with reflux until gelation; aging the gel for 1 to 24 hours for complete formation of the titania; drying the titania nanostructured at of 50 to 80° C. for about 1 to 24 hours, and subjecting the dried titania to a calcination step at 200 to 600° C. for 1 to 12 hours.

20 Claims, 5 Drawing Sheets

(51) Int. Cl.
    *B01J 35/02*       (2006.01)
    *B01J 37/03*       (2006.01)
    *B01J 37/08*       (2006.01)
    *C01G 23/08*      (2006.01)

(52) U.S. Cl.
    CPC .............. *B01J 37/08* (2013.01); *C01G 23/08* (2013.01); *C01P 2002/02* (2013.01); *C01P 2002/60* (2013.01); *C01P 2006/12* (2013.01); *C01P 2006/16* (2013.01); *C01P 2006/40* (2013.01)

(56) References Cited

U.S. PATENT DOCUMENTS

| | | | |
|---|---|---|---|
| 6,677,063 | B2 | 1/2004 | Finley |
| 2005/0079977 | A1 | 4/2005 | Choi et al. |
| 2006/0034752 | A1* | 2/2006 | Lin .......................... B01J 23/42 423/610 |
| 2006/0091079 | A1 | 5/2006 | Meng et al. |
| 2006/0144793 | A1 | 7/2006 | Dadachov |
| 2006/0171877 | A1* | 8/2006 | Dadachov ............ B01J 20/0211 423/610 |

OTHER PUBLICATIONS

Zhang, H. et al., Understanding Polymorphic Phase Transformation Behavior during Growth of Nanocrystalline Aggregates: Insights fro, TiO2, J. Phys. Chem. B, 2000, 104, 3481-3487.

Supplementary European Search Report dated Dec. 3, 2013 for EP Patent Application No. 13003180.0.

* cited by examiner

NANOSTRUCTURED TITANIA SEMICONDUCTOR MATERIAL AND ITS PRODUCTION PROCESS

This application is a divisional application of U.S. Ser. No. 13/922,952 filed Jun. 20, 2013 which is hereby incorporated by reference in its entirety.

FIELD OF THE INVENTION

The present invention relates to a nanostructured titania semiconductor material, termed TSG-IMP and its production process via the sol-gel method, which is basically made of titanium oxide, with the special feature that it is found as nanostructures, which gives special physicochemical (textural and morphological) properties, with ability to disperse and stabilize metal particles with high activity and selectivity mainly in catalytic processes.

BACKGROUND OF THE INVENTION

Titania, titanium oxide (IV) or titanium dioxide is a chemical compound having the formula $TiO_2$. Among other things, it is used in photocatalyzed advanced oxidation processes.

Titanium oxide (IV) $TiO_2$, occurs in nature in several ways:
  rutile (tetragonal structure),
  anatase (tetragonal structure), and
  brookite (orthorhombic structure).

Titanium oxide (IV) rutile and titanium oxide (IV) anatase are produced industrially in large quantities and are used as pigments and catalysts, as well as in the production of ceramic materials.

Titanium oxide (IV) is very important as a white pigment for its dispersion properties, chemical stability and non-toxicity. Titanium oxide (IV) is the most important inorganic pigment in terms of world production The science of metal oxide surfaces is a field of great interest for the catalysis, where surface oxides generally play a very important role, since most metals are oxidized when exposed to this environment. Titania ($TiO_2$) is used in heterogeneous catalysis, as a photocatalyst, in solar cells for producing hydrogen and electrical energy, such as gas sensor, as anticorrosive coating, as optical coatings, in ceramics, in electronic devices and as a white pigment in paints and cosmetics.

$TiO_2$ in its rutile-anatase phases is the most studied in the science of metal oxides. The study of $TiO_2$ in heterogeneous catalysis and the role of metals that are incorporated when acting as the catalyst support, reports its frequent use as a model for other Metal Oxide-metal systems, for all information that can be obtained from titania based catalysts.

One of the effects studied is the titania "Strong Metal Support Interaction (SMSI)", which is presented by encapsulation of the metal particles by reduction of $TiO_x$ overlayer.

A typical catalyst system is $TiO_2$-vanadium, used for selective oxidation reactions, and there is a whole field of research concerning vanadium and the vanadium-$TiO_2$ system, where some studies consider titania not properly as a support, but that its addition there to may substantially modify metal based catalysts.

Other areas of research and development are the photoelectric and photochemical properties of $TiO_2$, where the pioneering work in this area is to Fijishima A., Honda K, Nature 258 (1972) 37 on the photolysis of water to decompose into $H_2$ and $O_2$, where the point is to analyze the role of defect states of $TiO_2$ surface. Regarding the photochemical process to produce solar energy, $TiO_2$ has a low quantum yield, but colloidal suspensions have been used with addition of "dyed molecules" that can improve its use efficiency in solar cells.

A very active field of $TiO_2$ is in the photo-assisted reactions for reduction or degradation of volatile organic compounds (VOCs), the titania is a semiconductor and the hole-electron pair is created through the irradiation of UV light, generating loads that can lead to migrate to the surface where they react with the adsorbed water and oxygen to produce radicals, which interact with organic molecules to carry them to full decomposition to $CO_2$ and $H_2O$. By photo-assisted reactions using $TiO_2$ it is possible to purify water, bacterial disinfection, processes of self-cleaning mirrors and glass, and protective coating (preservation of art works), among the most important.

$TiO_2$ is used as the oxygen sensor to control the air/fuel ratio (A/F) in motor vehicles, which is designed for two types of temperature ranges, for example, at high temperature it is used for detecting oxygen in a long range of partial pressures, doping it with tri and pentavalent ions. For the case of low temperature Pt is added which leads to the formation of a diode type called "Schottky diode", which makes it highly sensitive against oxygen.

Among the applications of $TiO_2$, in so-called advanced technologies in the field of materials science, is its design as the best dielectric bridge to replace $SiO_2$-MOSFET devices (MOSFET.—Metal Oxide Semiconductor Field Effect Transistor), where the constraint on the use of titania is the dimension in thin $SiO_2$ films, which would be solved by preparing nanostructured materials of titania.

Other significant developments in photo catalytic technology of $TiO_2$, performed in the United States, are glass micro bubbles for specific application in the cleaning of oil films on water, particularly when most of an oil spill was removed. Also, it is the use of $TiO_2$ in photo catalysis for water supplying space crafts, according to the requirements of NASA (NASA.—National Aeronautics and Space Administration of the United States).

In the field of development of new catalytic materials "new generation materials" nanostructured materials are included, which have been the subject of various research and technological developments. The application of these new materials is varied, but in particular, they mostly are targeted to the fields of catalysis and medicine, and in particular the area of environmental catalysis. In the field of environmental catalysis, the development of nanostructured semiconductor materials for use in catalytic reactions is of great interest, such as titania, particularly in the processes of reduction or elimination of contaminants in gas or liquid phase.

The preparation or synthesis methods play an important role in the physicochemical properties of $TiO_2$. In the preparation of the $TiO_2$ various methods have been employed such as hydrolysis of titanium precursors followed by thermal treatment, sol-gel synthesis by pyrolysis, hydrothermal methods, and, in some cases, only by modifying the commercial $TiO_2$, being Degussa P25 of the more used.

According to reports in the literature, in most of the methods, variables that have the greatest impact on the preparation of $TiO_2$ include pH, hydrolyzing agents and hydrolysis temperature, but its effect depends greatly on the synthesis method applied, as for example, in the sol-gel method, variables such as the water/alkoxide ratio and the type of precursor used among others, have a significant impact for attain special physicochemical properties.

Among the most important physicochemical properties of $TiO_2$ as a catalytic material we find its texture, mainly: surface area, volume and pore size. The study of solid texture (size, shape and pore size distribution) is performed by physical adsorption of gas, this method being developed by Brunauer, Emmett and Teller, so called BET method, and its complement the BJH method, developed by Barrett, Joyner and Halenda, for determining pore diameter and volume.

In the study of materials, X-Ray Diffraction (XRD) is considered indispensable. The $TiO_2$ as catalyst support and/or catalyst has three crystal structures: brookite, anatase and rutile. Rutile phase is stable at high temperature (>700 C), the anatase is stable at low temperature (300-600° C.), and the brookite is a transition between the first two. Both the rutile and anatase are tetragonal crystal systems and brookite, usually located in minerals, presents an orthorhombic crystal system, apparently without catalytic properties.

The XRD technique can be applied in both qualitative and quantitative analysis of samples, where through these, it is possible to identify the compounds that make up the sample, and to evaluate the proportion of such compounds and calculate the size of its crystals. The above information can be obtained through the application of basic tools, such as Bragg's Law and the Formula of Integral Intensities. The information you can get is:

Space group and unit cell geometry, obtained from the collection of Bragg angles ($2\theta$); from these values we can also perform a qualitative identification of the crystalline phases;

Crystal size determination, by measuring the peak broadening, with which we also can indicate the crystal purity;

Atomic positions in the unit cell, by measuring the integral intensities of the peaks, which in turn enables the quantitative analysis of the phases present in the sample, and Analysis of texture, residual stress measurement and phase diagrams.

The determination of the energy band gap or band gap (Eg) of $TiO_2$ is essential for its activity in photo catalytic processes, and is obtained from the UV-vis spectra in the region of 200-800 nm. This region presents the fundamental transition from the valence band to the conduction band By Fourier Transform Infrared Spectroscopy (FTIR), one can identify the $TiO_2$ functional groups such as the identification of OH groups in its structure, which determines the degree of hydroxylation, important feature of the titania as catalyst material.

By analyzing Transmission Electron Microscopy (TEM) it is possible to determine its morphology, mainly the average crystal size of the $TiO_2$. Also, by selecting a crystal in the different zones of the micrographs, it is possible to obtain the single diffraction pattern, along with their corresponding interplanar spacings with the Digital Micrograph program, which are compared with those of JCPDS classified cards for $TiO_2$ (JCPDS.—Joint Committee on Powder Diffraction Standards), thereby determining the crystal structure in the corresponding direction (hkl).

Nanotechnology in the area of materials covers the fields of: design, creation, synthesis, manipulation and application of nanostructured materials, devices and functional systems through control of matter at the nanoscale.

The material properties can change considerably when their size is reduced to particles in the nanometer scale. In materials science, "particle" is a general term to describe small solid objects with any size ranging from the atomic scale ($10^{-10}$ m) to the microscopic scale ($10^{-3}$ m), but the size of the particle is often $10^{-9}$ to $10^{-5}$ m. Large particles (>$10^{-6}$ m) are commonly called grains (zeolites, carbons) and small particles (<2 nm) are frequently aggregated (metals) or clusters (metals, oxides). The term "crystallite" describes a small single crystal, the particles may be formed by one or more crystals.

Physical and chemical properties of a material are determined by the type of interactions between the electrons and between ions and electrons. By reducing the space where the electrons can move it is possible that novel effects appear due to the space confinement, this causes modifications on the energy levels in which the electrons can be within the particles. Because of this, and the fact that the surface to volume ratio is greatly increased, the nanoparticles exhibit new properties, which do not appear in the material in large quantities ("in bulk"), nor in the fundamental entities that constitute the solid.

There are two types of nanotechnology to prepare nanostructured materials:

The "Top-Down" method, which refers to the design of nanomaterials with reduced size (larger to smaller), and is based on the mechanisms to obtain nanoscale structures. This type of nanotechnology has been used in different fields, with the field of electronics the most applicable, but recently other fields have been incorporating, such as medicine and the protection of the environment, and The "Bottom-Up", which refers to the process of self-assembly, literally from a smaller size to a larger one, starting from a nanometric structure as a molecule passing through a process of self-assembly or assembly to create a mechanism larger than the initial mechanism. This is considered as the only and "real" nano approach, which allows that the material can be controlled in an extremely precise nanoscale.

Some of its properties are:

Increase in the surface area/volume ratio, inducing a huge increase in the interfacial area of the species on the surface;

Changes in the electronic structure of the species of the nanoparticle;

Changes in the ordering (crystal structure, interatomic distances, etc. . . . ) of the species in the nanoparticle and the presence of defects, and Confinement and quantum size effects due to the confinement of the charge carriers within the nanoparticle.

Among the main patent documents of the state of the art, the inventors identified as the closest to the present invention the following:

In Mexican Patent MX204.757 "Proceso mejorado para la obtención de óxidos de titanio tipo rutilo" (Improved process for producing rutile type titanium oxides) issued on Oct. 16, 2001, Isaac Schifter Secora and Luis Francisco Pedraza Archila recite an improved process for producing titanium oxide ($TiO_2$) rutile, by direct oxidation of titanium trichloride at low temperature, comprising the steps of:

1. preparing a solution of titanium trichloride in water, at a temperature lower than 5° C.;

2. continuously stirring the solution at room temperature, to put in contact with atmospheric air;

3. increasing the temperature of the solution to 30-80° C., and continue stirring for 2 to 30 days, until a white precipitate is obtained;

4. cooling the reaction mixture to room temperature and filter the precipitate consisting of a gel;

5. washing the product with deionized water;

6. filtering and drying the solid at temperatures of 30-130° C., for 10-70 hours, and 7. calcining the solid at temperatures of 200-800° C., in air for 1-20 hours
where:

As starting material titanium trichloride of 99% purity, titanium oxides or alkoxides are used;

Filtration is performed under vacuum;

The titanium trichloride solution is contacted with oxygen, and

The titanium trichloride results from contact of titanium oxide with hydrochloric acid.

Titanium dioxide of high purity, classified according to its crystallographic structure as determined by X-ray diffraction, such as rutile type $TiO_2$, by their physico-chemical properties can be used for application as a catalyst or catalyst support, photoconductive pigment, photocatalyst, especially in photodegradation of chlorinated hydrocarbons (in residual effluents).

In U.S. Pat. No. 6,677,063 B2 "Methods for obtaining photoactive coatings and/or anatase crystalline phase of titanium oxides and articles made therefrom", published on Jan. 13, 2004, James J. Finley refers to obtaining hydrophilic titanium oxide and/or rutile and anatase by ionic bombarding deposition of titanium metal oxide on a zirconium oxide film in the cubic phase.

Another technique is to deposit the titanium metal on a zinc oxide film in the cubic phase and heating the coating in an oxidizing atmosphere to provide anatase and/or rutile phase(s) of titanium oxide.

In the patent application U.S. 2006/0,091,079 A1 "Methods of preparing the product of titanium oxide surface-active and its use in water treatment processes", published on May 4, 2006, Meng et al. refer to a method for producing a crystalline titanium oxide with active surface that has a high adsorptive capacity and a high adsorption ratio with respect to dissolved contaminants including the steps of preparing a titanium oxide precipitate from a mixture comprising a hydrolysable titanium compound and heating the precipitate at a temperature below 300° C., without the calcination of the precipitate. Preferably, the titanium oxide product includes crystalline anatase having primary crystallite diameters in the range of 1-30 nm. The product of crystalline titanium oxide with active surface is used in the methods to remove inorganic contaminants dissolved from dilute aqueous streams by suspending the product in an aqueous stream or filtering an aqueous stream through a product bed.

In another method, a hydrolysable titanium compound is added to an aqueous stream so that titanium oxides form a co-precipitate with the pollutants dissolved in a bed of particulate material.

In Canadian patent application CA1,156,210 (A1) "Process of preparation of catalysts or catalyst carriers based on titania and their use in the Claus process of sulfur synthesis", published on Nov. 1, 1983, Dupin et al. refers to an improved process for preparing catalysts or catalyst carriers based on titania for the Claus process for sulfur synthesis, characterized in that it comprises the following steps:

1) kneading a mixture containing from 1 to 40% by weight water, up to 15% by weight of shaping additive, 45 to 99% by weight of a titanium oxide powder poorly crystallized and/or amorphous that presents a loss on ignition ranging from 1 to 50 wt %;

2) shaping this mixture, and 3) the mixture is dried and then products obtained are calcined at a temperature of from 200 to 900° C.

In the patent application U.S. Pat. No. 6,034,203 A "Catalysis with titanium oxides", published on Mar. 7, 2000, Lustig et al. refer to a process that can be used in oligomerization, polymerization or depolymerization such as, for example, production of a polyester. The process comprises contacting a carbonyl compound in the presence of a composition, with an alcohol. The catalyst comprises a catalyst having the formula: $MxTi^{(III)}_y Ti^{(IV)}_y O_{(x+3+4y)/2}$ where M is an alkali metal, $Ti^{(III)}$ is titanium in the oxidation state +3, $Ti^{(IV)}$ is titanium in the +4 oxidation state, x and y are numbers greater than or equal to zero wherein, if x equals zero, y is a number less than ½.

In patent application MY 140,229 (A) "Method for removing iron oxide deposits from the surface of titanium components," published Dec. 31, 2009, Belmonte et al. refer to a method and solvent composition capable of removing iron oxide deposits from the surface of titanium components without damaging the fundamental titanium component. The iron oxide deposits may be removed from the surface of the titanium component by contacting the titanium component with the solvent composition of the invention. The solvent composition may then be removed from contact with the titanium component to obtain a recyclable solvent composition that is recycled in repeated contact with the titanium component. The solvent composition comprises an aqueous mixture of an organic acid and hydrohalogenic acid.

Previous technologies known to the applicant, were overcome by the present invention, since none of the cited references relate to a semiconductor material of titania nanostructured comprising amorphous crystalline phases: anatase, rutile and brookite, as well as its production process.

It is therefore an object of the present invention to provide a semiconductor material consisting basically of titanium oxide, with the special feature of being nanostructures, which confers special physicochemical properties (textural and morphological) with ability to disperse and stabilize metallic particles with high activity and selectivity in catalytic processes mainly.

Another object of the present invention is to provide a process for producing a titania nanostructured semiconductor material via the sol-gel method.

A further object of the present invention to provide a process for producing a titania nanostructured semiconductor material where the dimension of the crystal size of the titania nanostructures of the semiconductor material depends on the particular handling or set of variables of so-gel method such as the types of metallic alkoxides of titanium used, the characteristics of the solvents, the alkoxide/water ratio, and the medium in which the hydrolysis takes place, which can be acidic or basic.

DETAILED DESCRIPTION OF THE INVENTION

The present invention relates to a nanostructured titania semiconductor material, termed TSG-IMP and its production process via the sol-gel method, which basically consists of titanium oxide and as a main feature has its nanoscale dimension, which gives special physicochemical properties (textural and morphological), with ability to disperse and stabilize metal particles with high activity and selectivity mainly in catalytic processes.

The semiconductor material of nanostructured titania TSG-IMP, obtained by the process of the present invention has advantages over the known products of this type, particularly in the dimension of its size and correspond with their physical and chemical properties that are determined by the type of interactions between the electrons, and between ions and electrons, by reducing the space where electrons can move it is possible that new effects appear due to the spatial confinement, which causes modifications on the energy levels in which electrons can be inside the particles.

Because of this, and the fact that the surface to volume ratio is greatly increased, the nanoparticles of the semiconductor material TSG-IMP have new properties, which do not appear in the material in large quantities ("in bulk"), neither in the fundamental entities that constitute the solid.

That is, the dimension of the crystal size of the titania nanostructures of semiconducting material TSG-IMP depends on the particular handling or the set of the sol-gel method variables such as the types of metal alkoxides of titanium used, the characteristics of solvents, the alkoxide/water ratio, and the medium in which the hydrolysis takes place, which can be acidic or basic.

Figure 1:
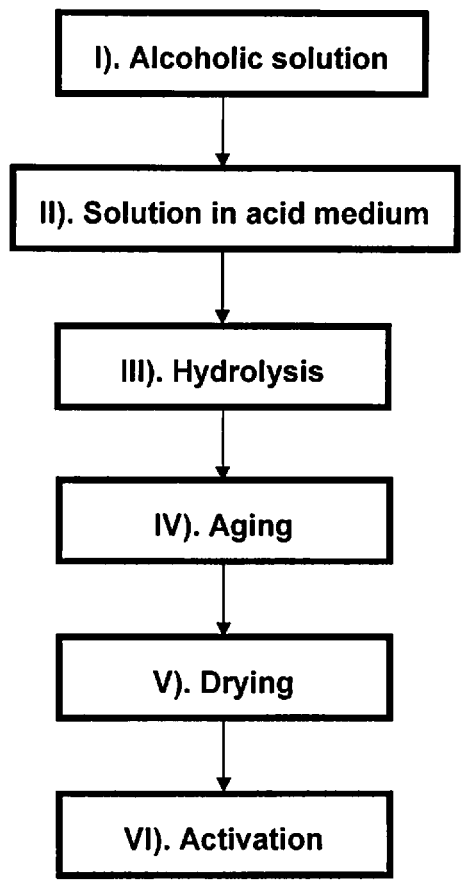
FIG. 1 shows a flowchart of the process of obtaining the titania nanostructured semiconductor material TSG-IMP.

For a better understanding of the process of obtaining the titania nanostructured semiconductor material TSG-IMP, FIG. 1 presents a flowchart showing the steps comprising:
I). Preparation of an alcoholic solution;
II). Solution in acid medium;
III). Hydrolysis;
IV). Aging;
V). Drying, and
VI). Activation or calcination Step I) Preparation of an alcoholic solution may be regarded as the preparation of the feedstock, and comprises adding to a system with constant stirring reflux a titanium alkoxide of three or four linear or branched carbons to an alcoholic solution, with alcohols from three to four linear or branched carbons.

Step II) Solution in acid medium, is the addition of an acid to the alcoholic solution obtained in step I), controlling the pH from 1 to 5, preferably 2 to 3, wherein the acid used is selected from: hydrochloric acid, nitric acid and acetic acid, nitric acid being preferred.

Step III) Hydrolysis, involves subjecting the solution in an acidic medium obtained in step II), in conditions of constant stirring and refluxing at a temperature of 70 to 80° C., to stabilize the medium and proceed with the dropwise addition of bidistilled water, in a molar ratio of water/alkoxide 1-2/0.100-0.150, preferably 1-2/0.120-0.130, continuing the reflux until gel formation.

Step IV) Aging, involves subjecting the gel obtained in step III) to an aging treatment to the same conditions of agitation and reflux of step III), for a period of 1-24 hours, preferably 4-12 hours for complete formation of the titania.

Step V) Drying, consists of drying the nanostructured titania obtained in step IV), at a temperature of 50 to 80° C., for a time from 1 to 24 hours, preferably at 60-70° C. for 4 to 12 hours.

Step VI) Activation or calcination, involves subjecting the dry titania obtained in step V), to a calcination step, with the option of using an oxidizing or reducing atmosphere at a temperature of 200 to 600° C., for a time from 1 to 12 hours, preferably at 300-500° C. for 3 to 9 hours.

The semiconductor material of TSG-IMP nanostructured titania, obtained by the process of the present invention has mainly the following new properties at different temperatures of activation:

Physicochemical properties, mainly morphological, of the titania nanostructures of semiconducting material TSG-IMP are shown in Tables 1 and 2.

Table 1 shows that the semiconductor material nanostructured titania TSG-IMP consisting of crystalline amorphous phases proportions: anatase, brookite and rutile.

TABLE 1

Proportion of amorphous crystalline phases of titania nanostructures of semiconductor material TSG-IMP

| Activation Temperature (° C.) | Crystalline Amorphous phase (%) General/(Preferred) | | |
|---|---|---|---|
| | Anatase | Brookite | Rutile |
| 200-300 | 60-70 (63-67) | 30-40 (33-37) | |
| 350-550 | 75-80 (76-78) | 12-17 (13-15) | 5-12 (7-10) |

The morphological properties, relative to the proportion of amorphous crystalline phases of titania nanostructures of semiconducting material TSG-IMP confer special properties to support, distribute and interact with active metals therein.

Nanostructured titania semiconductor material TSG-IMP presents crystal sizes crystalline by amorphous phase as shown in Table 2.

TABLE 2

Crystal sizes by crystalline amorphous phase on titania nanostructures of semiconducting material TSG-IMP

| Activation Temperature (° C.) | Crystalline Amorphous phase (nm) General/(Preferred) | | |
|---|---|---|---|
| | Anatase | Brookite | Rutile |
| 200-300 | 6-20 (7-19) | 6-20 (7-19) | |

TABLE 2-continued

Crystal sizes by crystalline amorphous phase on titania nanostructures of semiconducting material TSG-IMP

| Activation Temperature | Crystalline Amorphous phase (nm) General/(Preferred) | | |
|---|---|---|---|
| (° C.) | Anatase | Brookite | Rutile |
| 350-550 | 20-23 (21-22) | 12-17 (13-14) | 31-37 (33-34) |

Crystal dimension of titania nanostructures of semiconducting material TSG-IMP are shown in Table 3

TABLE 3

Crystal dimension of titania nanostructures of semiconductor material TSG-IMP

| Activation Temperature | Crystal size (nm) | |
|---|---|---|
| (° C.) | General | Preferred |
| 200-300 | 6-12 | 8-10 |
| 350-550 | 15-30 | 20-25 |

The size of the titania nanostructures of semiconducting material TSG-IMP affects textural properties thereof, particularly in: surface area, distribution of pore diameter and volume.

The textural properties of the titania nanostructures of semiconducting material TSG-IMP are shown in Table 4.

TABLE 4

Textural properties of titania nanostructures of semiconductor material TSG-IMP

| Activation Temperature | Surface Area (m²/g) | | Average Pore Diameter (Å) | |
|---|---|---|---|---|
| (° C.) | General | Preferred | General | Preferred |
| 200-300 | 180-250 | 190-220 | 30-50 | 35-45 |
| 350-550 | 60-100 | 70-90 | 70-110 | 75-95 |

Textural properties in Table 4, on the surface area and pore diameter of the titania nanoparticles of the semiconductor material TSG-IMP, confer special properties to support and distribute active metals on the same.

The Effect Called "Quantum Size Effect".

The dimension of the individual size of the titania nanostructures of semiconducting material TSG-IMP by crystalline amorphous phases affects the physicochemical properties of the same, particularly in the effect called "quantum size effect", related to their electronic properties, mainly the band gap energy, also known as band gap ($E_g$), which particularly in semiconductor materials is that handles dynamics of electron-hole pair formation, on which depends its efficiency in redox processes in which it is applied.

Commonly, in the semiconductor materials the goal is to decrease the $E_g$, but in the nanostructured titania semiconductor material TSG-IMP the effect on this particular value is special, that is, depending on the size of the nanostructure, not totally dependent on the value of $E_g$.

Nanostructured titania semiconductor material TSG-IMP by the effect of crystal size dimension of amorphous crystalline phases present bandgap energy ($E_g$) values shown in Table 5.

TABLE 5

Values Band gap Energy ($E_g$) of the titania nanostructures of semiconductor material TSG-IMP

| Activation Temperature | Band gap Energy ($E_g$) (eV) | |
|---|---|---|
| (° C.) | General | Preferred |
| 200-300 | 3.30-3.90 | 3.20-3.60 |
| 350-550 | 3.00-3.20 | 3.05-3.15 |

Morphological property on the value of $E_g$ of the semiconductor material nanostructured titania TSG-IMP gives special redox properties for use as support or catalyst in catalytic processes.

Degree of Hydroxylation.

The size of the titania nanostructures of semiconducting material TSG-IMP also affects, particularly the degree of hydroxylation as morphological property, as shown in FIGS. 2 to 7 and whose values are concentrated in Table 11.

Figure 2:
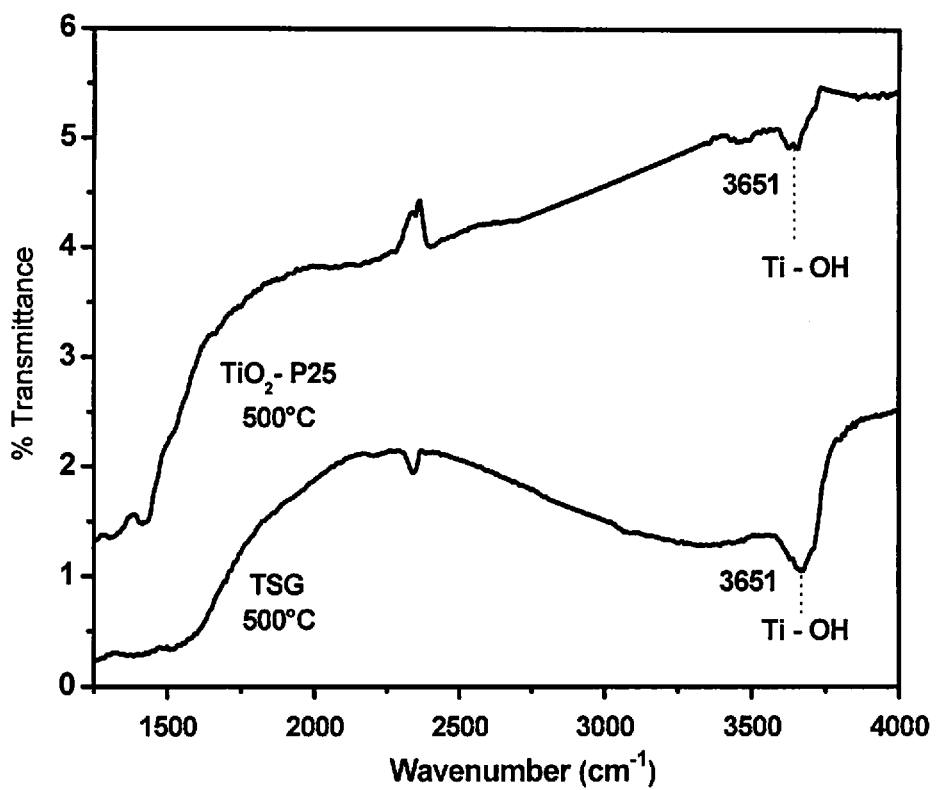
FIG. 2 integrates the infrared spectra on both the structure of the semiconductor material of nanostructured Titania TSGI5-IMP in Example 2, and the Commercial Titania Degussa P25, activated at 500° C., where OH groups are identified.

FIG. 2 integrates the infrared spectra on both the structure of the semiconductor material of nanostructured Titania TSGI5-IMP in Example 2, and the Commercial Titania Degussa P25, activated at 500° C., where OH groups are identified.

Figure 3:
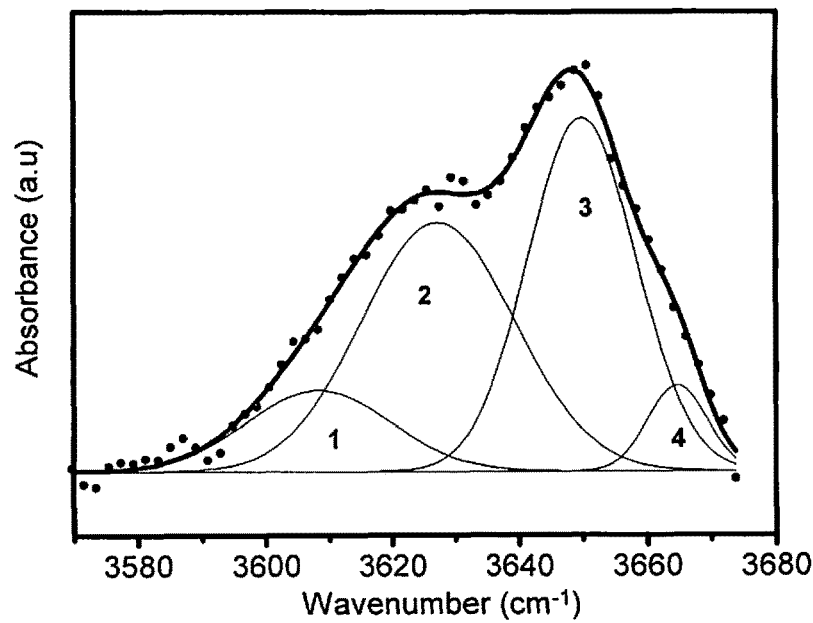
FIG. 3 shows a graph of Fourier transform infrared spectroscopy (FTIR), that shows the unrefined deconvolution of hydroxyl OH group zone, determined at 300° C., for Commercial Titania Degussa P25, activated at 500° C.

FIG. 3 shows a graph of Fourier transform infrared (FTIR) spectroscopy, wherein the unrefined deconvolution is observed of hydroxyl OH group zone, determined at 300° C., for Commercial Degussa Titania P25 activated at 500° C., and Table 6 shows the results

TABLE 6

Unrefined deconvolution of hydroxyl OH group Zone, determined at 300° C., for Commercial Titania Degussa P25, activated at 500° C.

| Peak | Area |
|---|---|
| 1 | 0.12597 |
| 2 | 0.40968 |
| 3 | 0.40857 |
| 4 | 0.05357 |
| Total Area: | 0.99779 |

Figure 4:
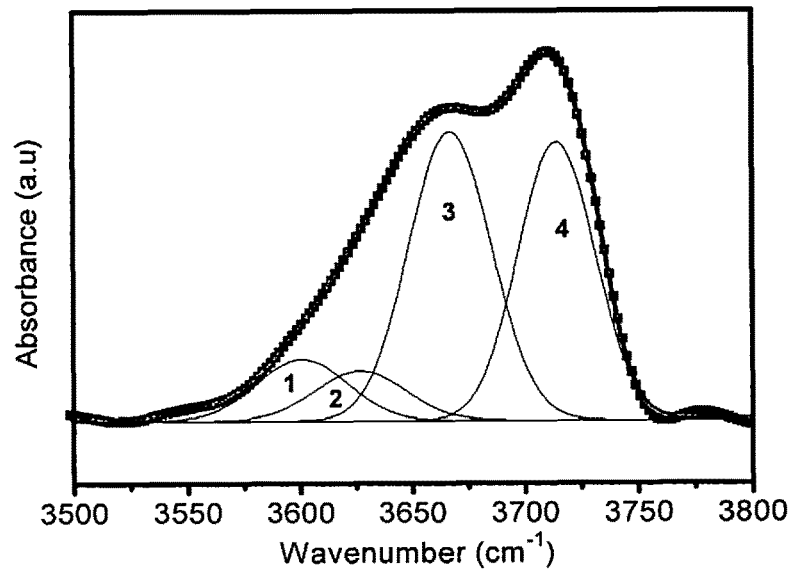
FIGS. 4 and 5 show graphs of Fourier transform infrared (FTIR) spectroscopy, wherein the unrefined and refined deconvolution are observed, respectively of hydroxyl OH group zone, determined at 300° C., for the semiconductor material of nanostructured Titania TSGI5-IMP of Example 2, activated at 500° C.
Figure 5:
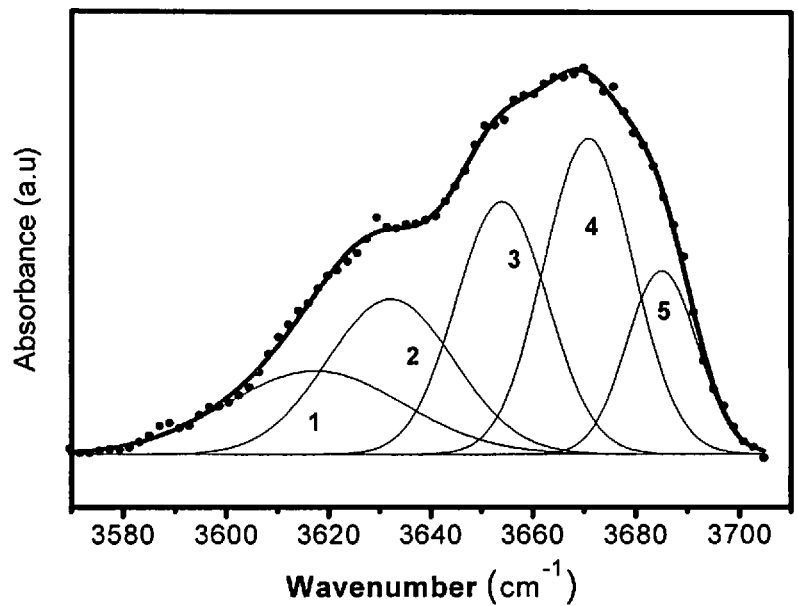

FIGS. 4 and 5 show graphs of Fourier transform infrared (FTIR) spectroscopy, wherein the unrefined and refined deconvolution are observed, respectively of hydroxyl OH group zone, determined at 300° C., for the semiconductor material Titania nanostructured TSGI5-IMP in Example 2, activated at 500° C., and in Tables 7 and 8 show the results

TABLE 7

Unrefined deconvolution Zone OH hydroxyl groups, determined at 300° C., for nanostructured Titania Semiconductor Material TSGI5-IMP in Example 2, activated at 500° C.

| Peak | Area |
|---|---|
| 1 | 0.13293 |
| 2 | 0.09869 |
| 3 | 0.71748 |
| 4 | 0.56065 |
| Total Area: | 1.50975 |

TABLE 8

Refined Deconvolution of hydroxyl OH group zone, determined at 300° C., for nanostructured Titania Semiconductor Material TSGI5-IMP in Example 2, activated at 500° C.

| Peak | Area |
|---|---|
| 1 | 0.58703 |
| 2 | 0.78711 |
| 3 | 0.92430 |
| 4 | 1.11660 |
| 5 | 0.51014 |
| Total Area: | 3.92518 |

Hydroxylation degree of 1.50975 of nanostructured Titania Semiconductor Material TSG5-IMP, is by 51% higher than 0.99779, the degree of hydroxylation of Commercial Titania Degussa P25, both values obtained for same conditions: using unrefined deconvolutions at 300° C., for those materials previously activated at 500° C.

This implies that the material of the present invention considerably improves the degree of interaction of the OH groups on the surface (hydroxylation level), very important feature of semiconductor material nanostructured Titania TSG-IMP of the present invention as a catalytic material.

Figure 6:
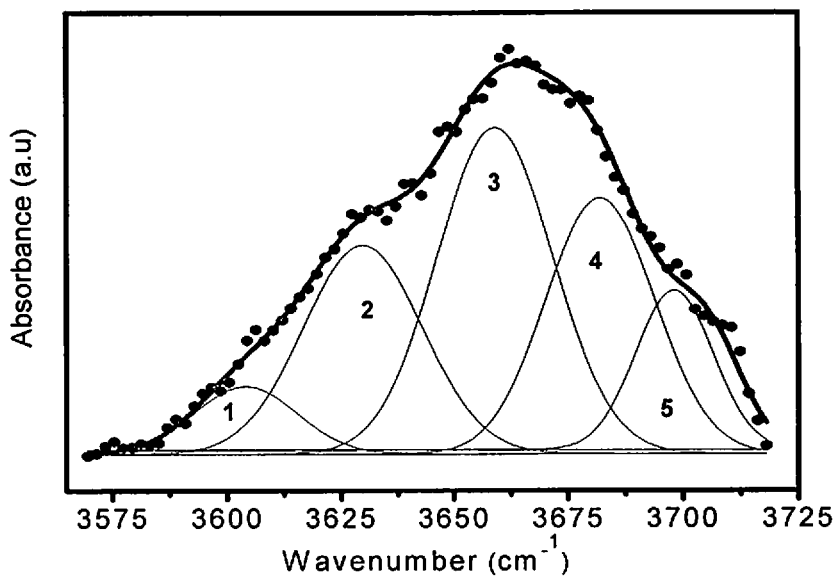
FIGS. 6 and 7 show graphs of Fourier transform infrared (FTIR) spectroscopy, wherein the deconvolution is observed unrefined and refined respectively of hydroxyl OH group zone, determined at 300° C., for the semiconductor material Titania nanostructured TSGI3-IMP in Example 1, activated at 300° C.
Figure 7:
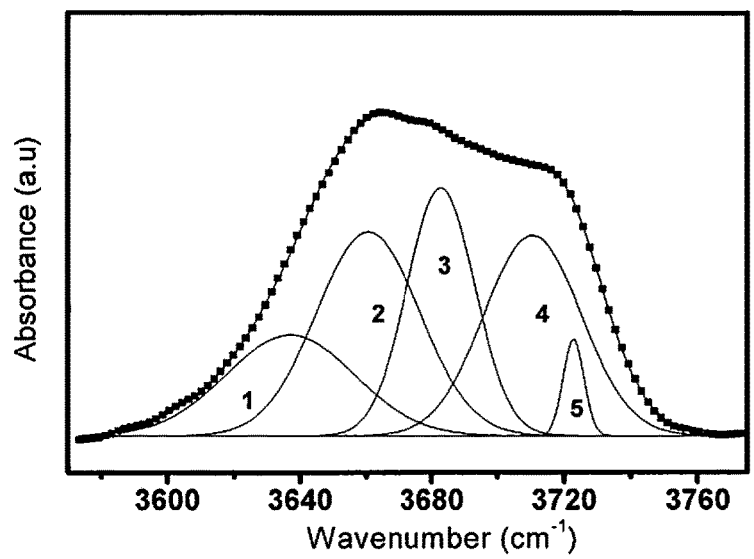

To supplement the information supporting the hydroxylation degree values concentrated in Table 11, in FIGS. 6 and 7 graphs of Fourier transform infrared (FTIR) spectroscopy are shown, wherein the unrefined and refined deconvolution is observed respectively, of the hydroxyl OH group area, determined at 300° C., for nanostructured Titania Semiconductor Material TSGI3-IMP in Example 1, activated at 300° C., and Tables 9 and 10 show the results.

TABLE 9

Unrefined deconvolution hydroxyl OH group Zone, determined at 300° C., for nanostructured Titania Semiconductor Material TSGI3-IMP in Example 1, activated at 300° C.

| Peak | Area |
|---|---|
| 1 | 0.37418 |
| 2 | 1.35672 |
| 3 | 2.05015 |
| 4 | 1.49360 |
| 5 | 0.40241 |
| Total Area: | 5.67706 |

TABLE 10

Refined deconvolution of hydroxyl OH group zone, determined at 300° C., for nanostructured Titania Semiconductor Material TSGI3-IMP in Example 1, activated at 300° C.

| Peak | Area |
|---|---|
| 1 | 1.17050 |
| 2 | 3.63112 |
| 3 | 4.79078 |
| 4 | 2.90619 |
| 5 | 0.39022 |
| Total Area: | 12.88881 |

TABLE 11

Degree of hydroxylation of the semiconductor material TSG-IMP

| Sample | Activation Temperature (° C.) | Hydroxylation Degree* |
|---|---|---|
| TSGI3-IMP | 300 | 5.67706-12.88881 |
| TSGI5-IMP | 500 | 1.50975-3.92518 |
| $TiO_2$ Commercial** | 500 | 0.99779 |

*Deconvolutions determined at 300° C.
**Commercial Titania Degussa P25.

The nanostructured titania semiconductor material TSG-IMP can be used mainly:

a) To support of active metal or as catalyst itself;

b) In heterogeneous or homogeneous catalytic processes for the reduction of pollutants present in gaseous and/or aqueous emissions, through thermal or photo assisted processes;

c) As catalytic matrices coating, such as ceramic and/or metallic monoliths made from different kinds of materials; such catalytic matrices may have different geometric shapes, as well as different types and arrangements of cells or channels, in order to streamline both contact and the contact times;

d) As a film on different substrates: glass, metals, polymers, etc., and e) Alone or with the addition of active metals, also with the purpose of controlling emissions of pollutants present in aqueous or gaseous emissions, using heterogeneous or homogeneous catalytic processes.

EXAMPLES

Here are some examples to get a better understanding of the present invention without limiting its scope

Example 1

Figure 8:
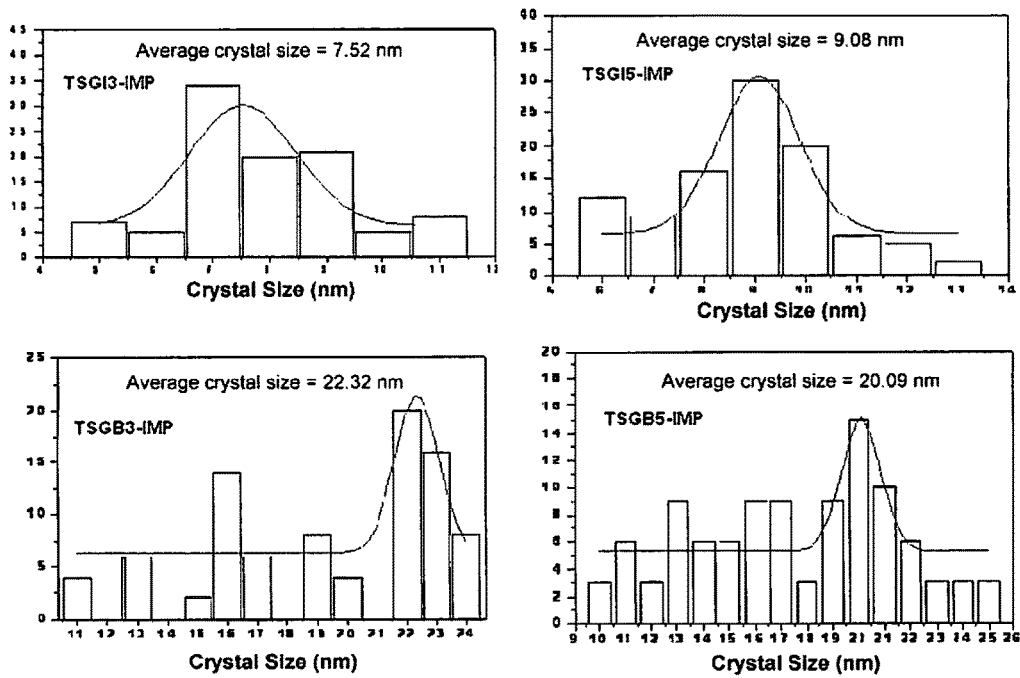
FIG. 8 shows the profile of crystal size distribution by TEM of some semiconductor materials TSG-IMP nanostructured titania, obtained by the process of the present invention.

A reflux system was used starting with 36.6 mL of titanium isopropoxide and 60 mL of 2-propanol maintained under constant stirring, and then the pH was adjusted to 2 with a hydrochloric acid solution. Once stabilized the medium under stirring and reflux conditions at 70° C., hydrolysis was carried out by adding dropwise 18 mL of bidistilled water in order to have a water/alkoxide molar ratio of 1/0.125, continuing the reflux until gelation, the solution was kept under stirring and reflux and start treatment of aging at 70° C. continued for 9 hours for complete formation of the titania. The titania nanostructured obtained was dried at 80° C. for 5 hours and finally the dry titania was calcined at 300° C. for 4 hours under nitrogen atmosphere. The catalyst obtained was identified as TSGI3-IMP and its texture and morphological properties are shown both in Tables 9 to 16, and in FIGS. 6 to 8.

Example 2

From the titania prepared as in Example 1, the calcination process was conducted at 500° C. for 4 hours under nitrogen atmosphere. The catalyst obtained was identified as TSGI5-IMP and its texture and morphological properties are shown both in Tables 7, 8 and 11 to 16, and in FIGS. 4, 5 and 8

Example 3

A reflux system was used, starting from 43.9 mL of titanium butoxide and 300 mL of butanol, maintained under constant stirring, then the pH was adjusted to 2 with nitric acid solution, once stabilized the medium under stirring and refluxing conditions at 70° C., the hydrolysis was carried out by adding dropwise 22 mL of bidistilled water in order to obtain a water/alkoxide molar ratio of 2/0.125, continuing the reflux until gelation, the solution was kept under stirring and reflux and start treatment of aging at 70° C. continuing for 9 hours for complete formation of the titania. The titania nanostructured obtained was dried at 80° C. for 5 hours and finally the dry titania calcined at 300° C. for 4 hours under oxidizing atmosphere. The catalyst was identified as TSGB3-IMP and its texture and morphological properties shown in both Tables 12 and 16, and in FIG. 8

Example 4

From the titania prepared as in Example 3, the calcination process was conducted at 500° C. for 4 hours under nitrogen atmosphere. The catalyst obtained was identified as TSGI5-IMP and its texture and morphological properties are shown both in Tables 12 to 16, and in FIG. 8.

TABLE 12

Textural properties by BET/BJH of nanostructured titania semiconductor material TSG-IMP

| Catalyst | Surface Area ($m^2/g$) | Pore Volume ($cm^3/g$) | Average Pore Diameter (Å) |
|---|---|---|---|
| TSGI3-IMP | 189 | 0.17 | 36 |
| TSGI5-IMP | 70 | 0.11 | 76 |
| TSGB3-IMP | 212 | 0.25 | 48 |
| TSGB5-IMP | 72 | 0.16 | 91 |
| Commercial $TiO_2$* | 50 | 0.15 | 116 |

*Commercial Titania Degussa P25, activated at 500° C.

TABLE 13

Morphological properties by XRD-Rietveld refinement of nanostructured titania semiconductor material TSG-IMP

| Sample | Crystal Size (nm) | | | Crystalline Amorphous Phase (%) | | |
|---|---|---|---|---|---|---|
| | Anatase | Brookite | Rutile | Anatase | Brookite | Rutile |
| TSGI3-IMP | 7.03 | 18.26 | — | 62.88 | 37.12 | — |
| TSGI5-IMP | 21.04 | 17.00 | 33.00 | 80.00 | 14.90 | 5.10 |
| TSGB3-IMP | 8.34 | 6.66 | — | 64.02 | 35.98 | — |
| TSGB5-IMP | 20.62 | 13.78 | 33.00 | 79.00 | 16.00 | 5.00 |

TABLE 14

Average crystal size by XRD-Rietveld refinement of nanostructured titania semiconductor material TSG-IMP

| Catalyst | Average Crystal Size (nm) |
|---|---|
| TSGI3-IMP | 7.52 |
| TSGI5-IMP | 22.32 |
| TSGB3-IMP | 9.08 |
| TSGB5-IMP | 20.09 |

TABLE 15

Band Positions of Functional Groups by FTIR of nanostructured titania semiconductor material TSG-IMP

| | Band Position ($cm^{-1}$) | | | | |
|---|---|---|---|---|---|
| | Vibrational Elongation | | | Flexion | |
| Catalyst | "Ti—OH | O—H | C—H | C—H | O—H |
| TSGI3-IMP | 3,648 | 3,205 | 2,927 | 1,464 | 1,620 |
| TSGI5-IMP | 3,655 | 3,445 | 2,928 | 1,464 | 1,617 |
| TSGB3-IMP | 3,713 | 3,320 | 2,927 | 1,412 | 1,610 |
| TSGB5-IMP | 3,677 | 3,371 | 2,943 | 1,438 | 1,633 |

TABLE 16

Energy ratio values of Bandgap UV-vis and Crystal Size of nanostructured titania semiconductor material TSG-IMP

| Catalyst | Eg (eV) | Crystal Size (nm) | Crystalline Amorphous Phase | Concentration (%) |
|---|---|---|---|---|
| TSGI3-IMP | 3.85 | 7.03 | Anatase | 62.88 |
| | | 18.26 | Brookite | 37.12 |
| TSGI5-IMP | 3.15 | 21.04 | Anatase | 80.00 |
| | | 17.00 | Brookite | 14.90 |
| | | 33.00 | Rutile | 5.10 |
| TSGB3-IMP | 3.35 | 8.34 | Anatase | 64.02 |
| | | 6.66 | Brookite | 35.98 |
| TSGB5-IMP | 3.1 | 20.62 | Anatase | 79.00 |
| | | 13.78 | Brookite | 16.00 |
| | | 33.00 | | 5.00 |
| $TiO_2$ Commercial* | 3.2 | 40 | Anatase | 70 |
| | | 60 | Rutile | 30 |

*Commercial Titania Degussa P25, activated at 500° C.

The invention claimed is:

1. A process for producing a nanostructured titania semiconductor material comprising the steps of:
   forming a titanium alkoxides solution at a pH or 1 to 5;
   subjecting the solution to hydrolysis under reflux conditions and adding an amount of water to form a gel;
   aging the gel;
   drying the gel; and
   calcining the aged gel to form said nanostructured titania semiconductor material having crystalline amorphous phases of anatase, brookite and rutile, in the following proportions:

| Activation Temperature | Crystalline Amorphous phase (%) | | |
|---|---|---|---|
| (° C.) | Anatase | Brookite | Rutile |
| 200-300 | 60-70 | 30-40 | |
| 350-550 | 75-80 | 12-17 | 5-12. |

2. The process for producing the nanostructured titania semiconductor material according to claim 1, wherein the nanostructured titania semiconductor material shows the following crystal sizes for crystalline amorphous phase:

| Activation Temperature | Crystalline Amorphous Phase (nm) | | |
|---|---|---|---|
| (° C.) | Anatase | Brookite | Rutile |
| 200-300 | 6-20 | 6-20 | |
| 350-550 | 20-23 | 12-17 | 31-37. |

3. The process for producing the nanostructured titania semiconductor material TSG-IMP according to claim 1 having the following crystal dimension:

| Activation Temperature (° C.) | Crystal Dimension (nm) General |
|---|---|
| 200-300 | 6-12 |
| 350-550 | 15-30. |

4. The process for producing the nanostructured titania semiconductor material according to claim 1 having the following textural properties:

| Activation Temperature (° C.) | Surface Area ($m^2/g$) General | Average Pore Diameter (Å) General |
|---|---|---|
| 200-300 | 180-250 | 30-50 |
| 350-550 | 60-100 | 70-110. |

5. The process for producing the nanostructured titania semiconductor material according to claim 1 having the following band gap energy (Eg) values:

| Activation Temperature (° C.) | Band gap Energy (Eg) (eV) General |
|---|---|
| 200-300 | 3.30-3.90 |
| 350-550 | 3.00-3.20. |

6. The process for producing the nanostructured titania semiconductor material according to claim 1 having the following hydroxylation degrees:

| Activation Temperature (° C.) | Hydroxylation Degree* |
|---|---|
| 300 | 5.67706-12.88881 |
| 500 | 1.50975-3.92518 |

*Deconvolutions determined at 300° C.

7. The process of claim 1, wherein said titanium alkoxides solution is an alcoholic solution.

8. The process of claim 1, wherein said water is added to titanium alkoxide solution in a water/alkoxide molar ratio of 1-2/0.100-0.150.

9. The process of claim 1, wherein said aging is under agitation and reflux conditions.

10. The process of claim 1, wherein said drying is at 50° C. to 80° C. and said calcining is at 200° C. to 600° C.

11. A process of making a nanostructured titania semiconductor material, comprising the following steps:
   I) preparing an alcoholic solution by adding a titanium alkoxide to an alcoholic solution to a reflux system with constant agitation;
   II) adding an acid to the alcoholic solution of step I) to a pH from 1 to 5 to form an acid medium;
   III) subjecting the solution in acid medium obtained in step II) to stirring and reflux conditions at a temperature of 70 to 80° C. to stabilize the medium, and adding bidistilled water in a water/alkoxide molar ratio of 1-2/0.100-0.150, and continuing reflux until gel formation;
   IV) aging the gel obtained in step III) under the same agitation and reflux of step III) for 1 to 24 hours to form the titania;
   V) drying nanostructured titania obtained in step IV) at a temperature of 50 to 80° C. for a 1 to 24 hour period; and
   VI) calcining the dry titania obtained in step V) at a temperature of 200 to 600° C. for a 1 to 12 hours;
   wherein said nanostructured titania semiconductor material comprises anatase, brookite and rutile amorphous phases in the following proportions

| Activation Temperature (° C.) | Crystalline Amorphous phase (%) | | |
|---|---|---|---|
| | Anatase | Brookite | Rutile |
| 200-300 | 60-70 | 30-40 | |
| 350-550 | 75-80 | 12-17 | 5-12. |

12. The process of claim 11, wherein the titanium alkoxide in step I) has three or four branched or linear carbons.

13. The process of claim 11, wherein the alcoholic solution in step I) includes and alcohol having three or four linear or branched carbon atoms.

14. The process of claim 11, wherein the acid medium of step II), has a pH of 2 to 3.

15. The process of claim 11, wherein the acid in acid medium of step II) is selected from the group consisting of hydrochloric acid, nitric acid and acetic acid.

16. The process of claim 11, wherein the water/alkoxide molar ratio in step III) is 1-2/0.120-0.130.

17. The process of claim 11, wherein aging time of step IV), preferably is from 4 to 12 hours.

18. The process of claim 11, wherein the drying of step V) is at 60-70° C. for 4 to 12 hours.

19. The process of claim 11, wherein calcination of step VI) is under an oxidizing or reducing atmosphere.

20. The process of claim 11, wherein calcination of stage VI) is at 300-500° C. for 3 to 9 hours.

* * * * *